United States Patent
Truu et al.

(10) Patent No.: US 10,200,199 B2
(45) Date of Patent: *Feb. 5, 2019

(54) STRENGTHENED ENTITY IDENTITY FOR DIGITAL RECORD SIGNATURE INFRASTRUCTURE

(71) Applicant: Guardtime IP Holdings Limited, Tortola (VG)

(72) Inventors: Ahto Truu, Tartu (EE); Andres Kroonmaa, Sauevald (EE)

(73) Assignee: Guardtime Holdings Limited, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 15/854,418

(22) Filed: Dec. 26, 2017

(65) Prior Publication Data

US 2018/0139057 A1    May 17, 2018

Related U.S. Application Data

(63) Continuation-in-part of application No. 15/295,928, filed on Oct. 17, 2016, now Pat. No. 9,853,819, which is a continuation-in-part of application No. 13/959,734, filed on Aug. 5, 2013, now Pat. No. 9,473,306.

(51) Int. Cl.
  *H04L 9/32* (2006.01)
  *H04L 9/14* (2006.01)
  *H04L 9/06* (2006.01)
  *H04L 9/30* (2006.01)

(52) U.S. Cl.
  CPC .......... *H04L 9/3247* (2013.01); *H04L 9/0643* (2013.01); *H04L 9/14* (2013.01); *H04L 9/30* (2013.01); *H04L 9/3236* (2013.01); *H04L 9/3239* (2013.01); *H04L 9/3242* (2013.01); *H04L 9/3297* (2013.01); *H04L 2209/38* (2013.01)

(58) Field of Classification Search
  CPC . H04L 9/0643; H04L 9/14; H04L 9/30; H04L 9/3239; H04L 9/3242; H04L 9/3247; H04L 2209/38; H04L 2209/56; H04L 63/0823; H04L 63/102
  See application file for complete search history.

(56) References Cited

U.S. PATENT DOCUMENTS

| | | | |
|---|---|---|---|
| 2010/0005310 A1* | 1/2010 | Gentry | H04L 9/3242 713/176 |
| 2013/0276058 A1* | 10/2013 | Buldas | G06F 21/64 726/2 |
| 2015/0295720 A1* | 10/2015 | Buldas | H04L 9/3247 713/176 |
| 2017/0004168 A1* | 1/2017 | Hakala | G06F 17/30327 |
| 2017/0033933 A1* | 2/2017 | Haber | G06F 21/64 |
| 2017/0070350 A1* | 3/2017 | Ryu | H04L 9/3247 |

* cited by examiner

*Primary Examiner* — Minh Dinh
(74) *Attorney, Agent, or Firm* — Jeffrey Pearce

(57) ABSTRACT

At least one node in a distributed hash tree verification infrastructure is augmented with either a function of a signature of a child computational node, or of a child entity attestation value derived from an HMAC value of the child entity, or both. A data signature, which includes parameters for recomputation of a verifying value, and which is associated with a digital input record, will therefore also include data that identifies at least one child entity in the hash tree path used for its initial registration in the infrastructure.

5 Claims, 15 Drawing Sheets

STRENGTHENED ENTITY IDENTITY FOR DIGITAL RECORD SIGNATURE INFRASTRUCTURE

CROSS-REFERENCE TO RELATED APPLICATIONS

This application is a continuation-in-part of currently pending U.S. patent application Ser. No. 15/295,928, which is to issue as U.S. Pat. No. 9,853,819 on 26 Dec. 2017, which is turn is a continuation-in-part of U.S. patent application Ser. No. 13/959,734, which issued as U.S. Pat. No. 9,473,306 on 18 Oct. 2016. This application claims priority of both of these previous applications.

FIELD OF THE INVENTION

This invention relates to an electronic system and method for verifying that a document is authentic, as well as the identity of one or more entities participating in the system.

BACKGROUND

The ability to verify the authenticity of documents (defined broadly as any set of digitized information) in the electronic age has become more challenging at the same time as it has become more needed. Documents in electronic form are everywhere in modern banking, commerce, government, law, indeed, in modern life in general. In a world where documents are created, submitted, processed, stored, considered, etc., all electronically, sometimes even in multiple locations in the "cloud" unknown to the users themselves, notary or other official seals, physical signatures, special papers and other such tools are becoming increasingly unsuitable and unreliable.

Perhaps the most common way at present to verify the authenticity of electronic documents is to use some form of digital signature to "sign" them, which is typically accomplished using some form of asymmetric cryptography. Many different signing schemes are known that are suitable for signing both individual and sets of documents. At present, the most common data-signing methods rely on some form of the PKI (Public Key Infrastructure). A disadvantage of PKI-based digital signature schemes, however, is that the keys can be compromised; once a key is known to be compromised, any signatures created with that key can no longer be relied on. Since the likelihood that a key will become compromised increases over time, signatures created using keyed cryptography are useful mostly for a short-term purposes.

One other common method for verification involves publication, including, for example (but not necessarily) proof of an order of receipt using a sequence value bound to the digital record. When publishing is used to make a verifiable binding, the service provider typically publishes a digital record together with a sequence value in a widely-witnessed manner, for example, in a newspaper. If the service provider commits to certain rules regarding publication, then the published content can be relied upon as having been certified by the service provider. Since no cryptographic keys are used in the publication method, the problem of key compromise is not a concern. However, the publication method is inefficiently slow and unsuitable for large document collections. Publication is realistic daily or weekly, but instant certificate creation, though demanded by the modern electronic market, is impossible.

When it comes to verifying the authenticity of digital documents, regardless of whether the user cares about proof of receipt order or not, most existing methods have the serious flaw that users must in some way trust some service provider and/or clock at some point. In short, one or both of two common problems beset known authentication schemes: either there must be some "trust authority" or the systems are not amenable to extensive scalability.

Guardtime AS of Tallinn, Estonia, provides a keyless, distributed hash tree-based data signature infrastructure that it currently refers to as the Keyless Signature Infrastructure (KSI). The KSI infrastructure provides a robust and scalable verification system that does not require a trusted authority and, as its name implies, does not need to rely on keys. Although such a distributed, hash tree-based infrastructure (Guardtime's or otherwise) can verify the authenticity of a given document to a very high degree of certainty (especially Guardtime's), in many cases it may be desirable to be able to verify not only the contents of a given document, but also to identify one or more of the entities involved in the original document-registration process.

BRIEF DESCRIPTION OF THE DRAWINGS

FIG. 1 illustrates various layers of a generalized digital record verification and signing infrastructure.

FIG. 2 illustrates the verification infrastructure along with various data and computational structures maintained and computed within the different layers.

FIG. 3 shows a subset of FIG. 2 to illustrate a digital signature and recomputation of authentication values using the signature.

FIG. 4 illustrates publication to create a permanent trust-free authentication feature.

FIG. 5 illustrates extension of a digital signature to enable system-independent authentication by recomputation.

FIG. 6 illustrates self-ID augmentation of the verification infrastructure.

FIG. 7 illustrates assigned-ID augmentation of the verification infrastructure.

FIG. 8 illustrates the verification infrastructure in terms of the main hardware components that will typically be used to implement aspects of the invention, as well as different ways to enable user-controlled identification.

FIGS. 9 and 10 illustrate respective embodiments in which either calendar values individually, or in digital combination over a period, are committed to a distributed, widely witnessed data structure such as a blockchain.

FIGS. 11A and 11B illustrate a method for identifying entities in a data signature infrastructure.

FIGS. 12A-12C illustrate a data structure for signing aggregation hashes.

FIGS. 13A and 13B illustrate entity signing on a child entity side.

FIGS. 14A and 14B illustrate entity signing for authentication.

FIGS. 15A and 15B illustrate entity signing for authentication, with server-attested ID.

DETAILED DESCRIPTION

To understand how ID augmentation of a verification infrastructure operates, it's helpful first to understand how the "bare" infrastructure works to enable document authentication. By way of example, a keyless, distributed, hash tree-based infrastructure as provided by Guardtime AS will therefore first be described, after which are described different modifications to such an infrastructure to enable verifiable identification of any or all of the entities that participated in registration of a given document.

Figure 1:
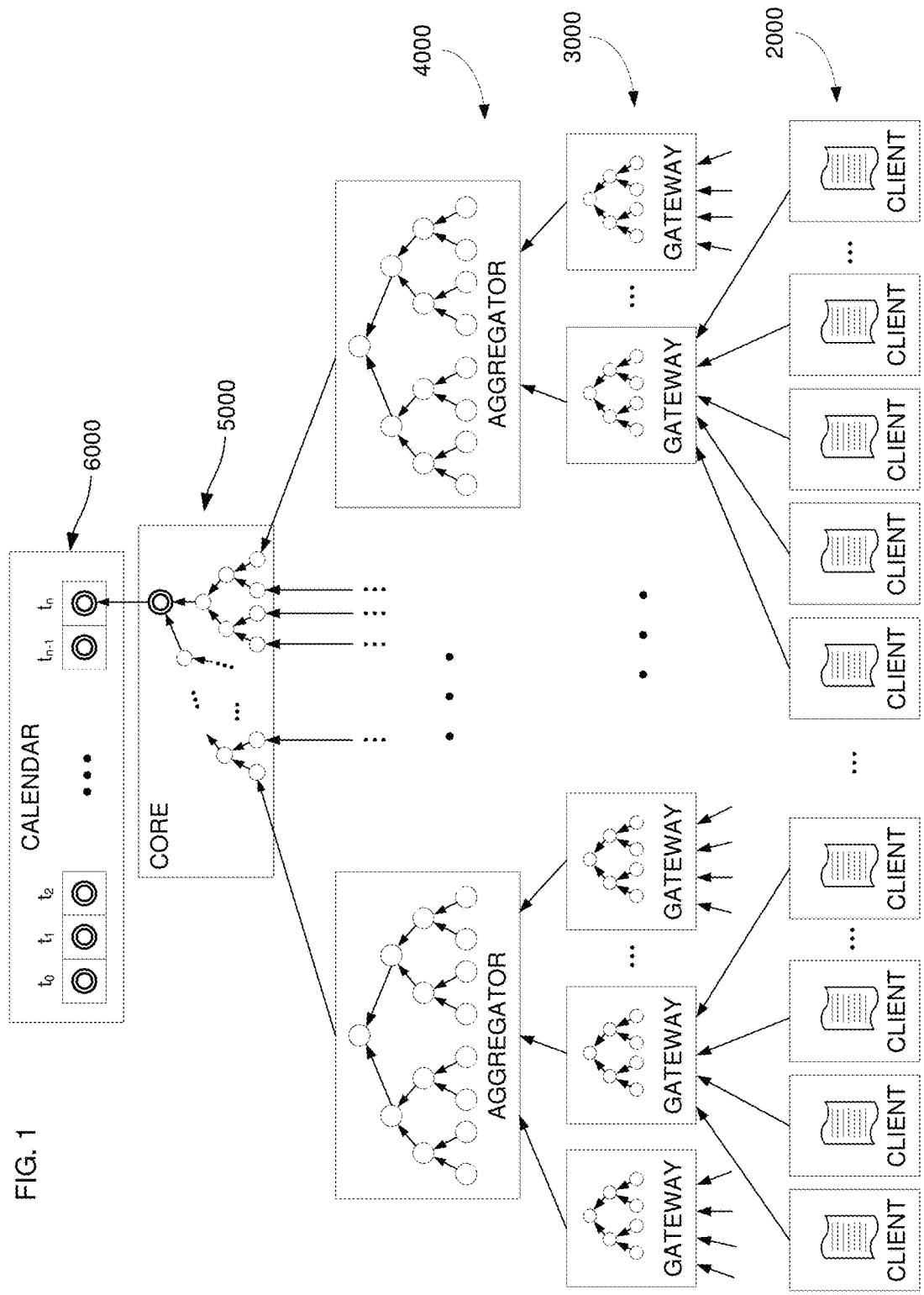
Figure 2:
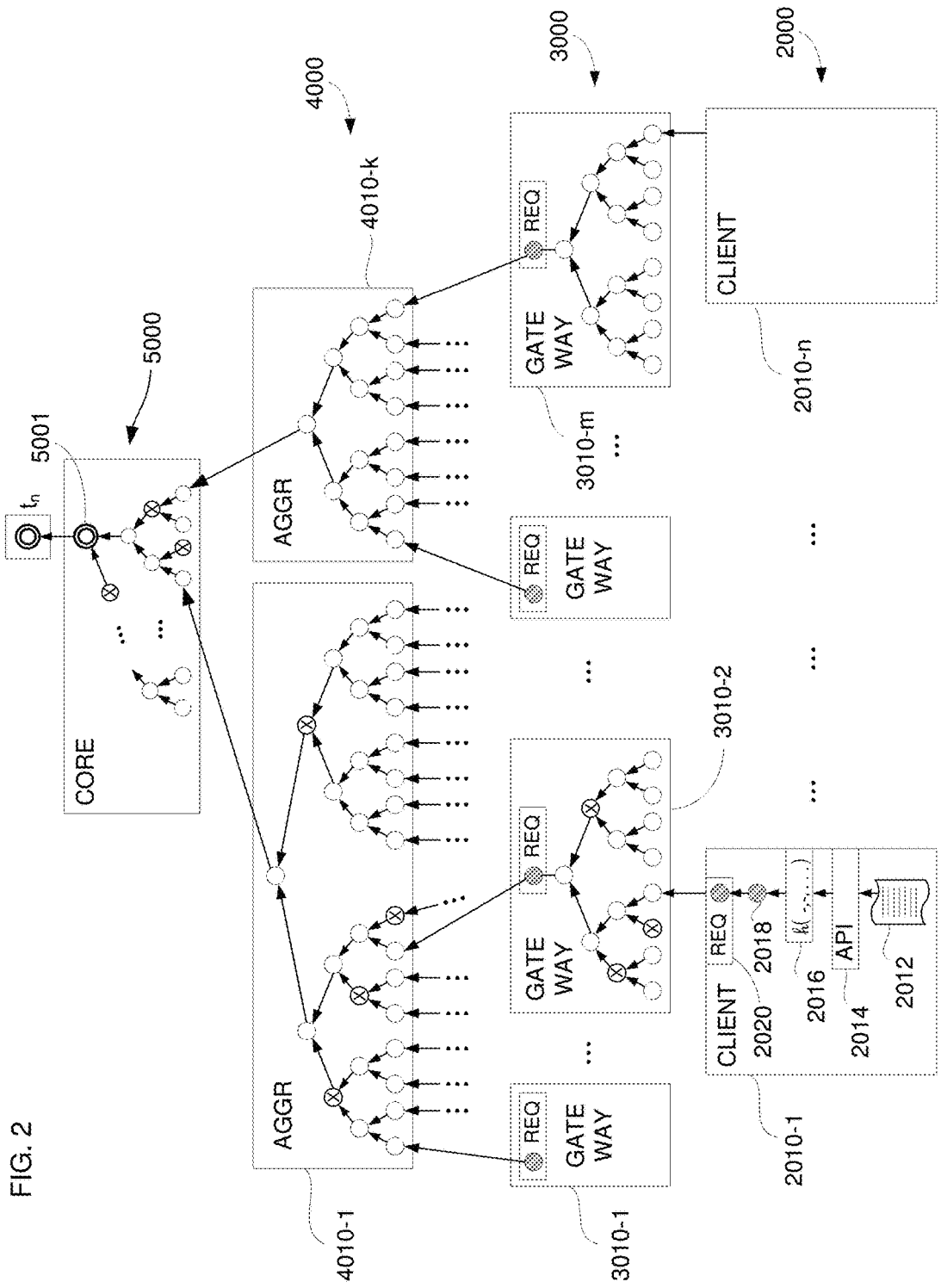

FIGS. 1 and 2 show the general Guardtime KSI infrastructure as having several different layers: a client layer 2000 comprising a number of client systems; a layer of gateways 3000; a layer including one or more aggregation systems 4000; and an uppermost layer 5000 that includes a "core". Although FIG. 1 shows the various layers as being separate and distinct, some implementations of the main principles of the infrastructure might consolidate or do without some of the layers or might need to add additional layers for administrative or other purposes.

As FIG. 1 also illustrates, the core layer 5000 will in general be common to all users of the system and typically operated by a highest-level administrator/provider, whereas lower, subordinate layers 2000, 3000, 4000 will in many implementations have a unique configuration depending on the needs and preferences of users. The distinction between "core/common" and "unique/distributed" is not hard and fast, however—in some implementations, the core, that is, centrally administered system, will encompass structures and functions that also are used in lower layers. One of the advantages of this infrastructure is that it allows for almost unlimited scalability and reconfiguration of the non-core layers to meet particular implementation needs. All that is required is that the various layers perform the specified functions, with common protocols for entering a digital record into the verification system and for generating registration requests.

Figure 8:
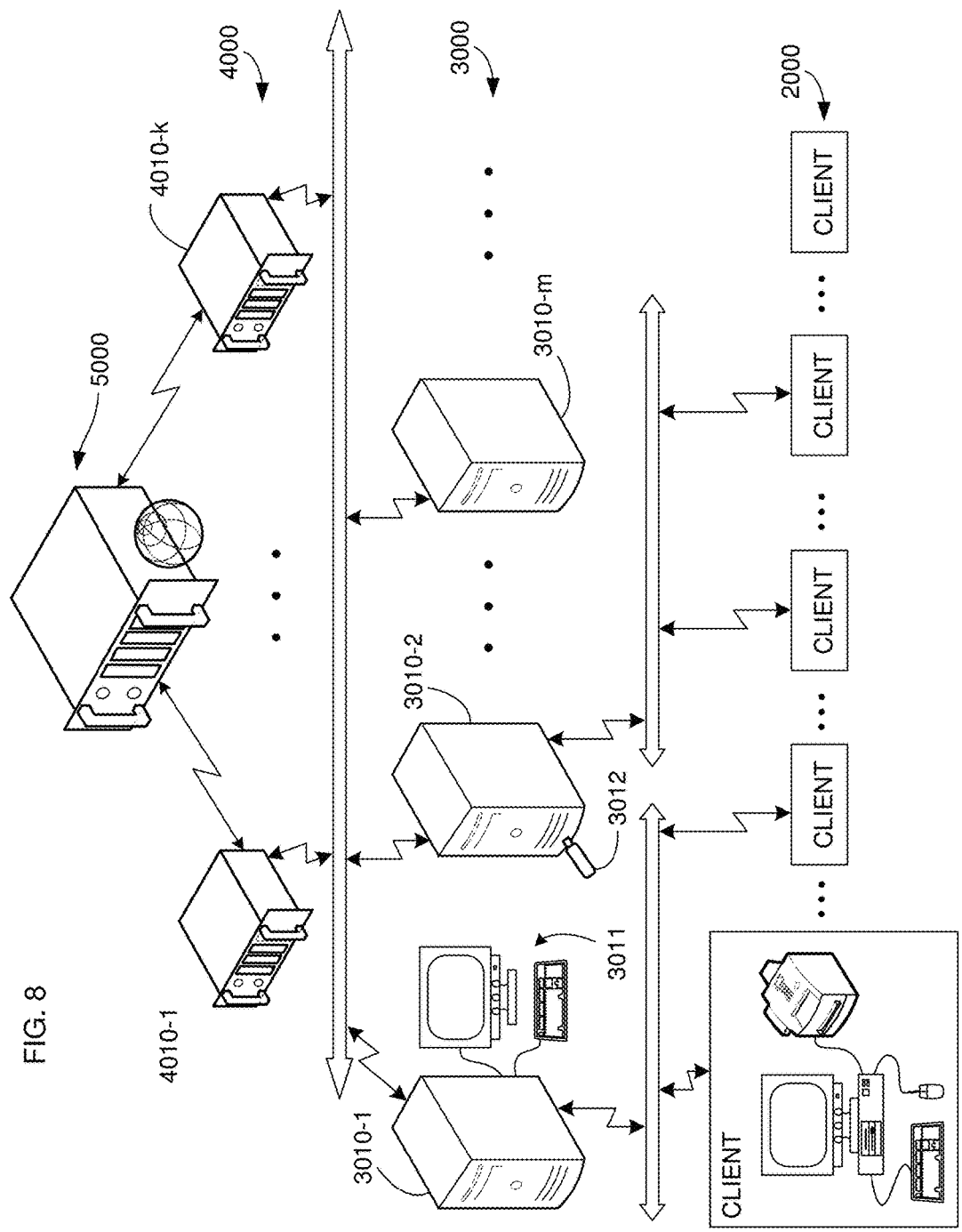

As FIG. 1 shows functionally and FIG. 8 shows in terms of hardware, a gateway in the layer 3000 will typically be a computer system such as a server with which one or more of the clients communicates, over a network or dedicated line, so as to receive requests for registration of each digital record that a client submits. In many implementations, a gateway will be a server controlled by an enterprise or some third-party provider, which may be a server known to and maybe even controlled by an organization to which the client user belongs, or a server accessed through a network such as the Internet. In short, a gateway may generally be any server located anywhere and configured to receive requests from clients for digital record registration. Gateway systems do not need to be of the same type; rather, one gateway might be a server within a company that employs many clients, whereas another gateway might be a server accessible online by arbitrary users. Of course, gateways could also be commercial systems, such that access for verification is granted only upon payment of a fee.

An aggregator in the aggregation layer 4000 will similarly be a computer system such as a server intended to receive registration requests, again, typically over a network or dedicated line, that have been consolidated (or "aggregated") by respective gateways. Depending upon the scale and design requirements of a given implementation, any aggregator could also be controlled by the owner of the core, or the owner of the same systems as the gateways and clients, or could be provided by an entirely different entity, and in some cases it would also be possible to consolidate the aggregator and gateways for particular set of clients.

As an example, large corporations or government entities might prefer to implement and benefit from the advantages of the infrastructure using only their own dedicated systems. Nearer the other end of the spectrum of possibilities would be that the gateways and aggregators could all be configured using "cloud computing" such that a user at the client level has no idea where any particular gateway or aggregator is located or who controls the servers. One of the advantages of this infrastructure is that digital input records can still be verified with near total security even in situations where users and others do not know if they can trust the systems in the gateway or aggregation layers 3000, 4000; indeed, it is not even necessary to trust the administrator of the core 5000 in order to have essentially total reliability of verification.

The different terms "aggregator" in layer(s) 4000 and "gateway" in layer(s) 3000 are not intended to imply that the systems (such as servers) that comprise them are functionally significantly different—a gateway "aggregates" the requests of the clients it serves and as such could be viewed as a "local" or "lower level" aggregator in its own right. In many implementations, however, gateways may be under the control of entities more closely associated with the clients and aggregators will be more closely associated with the overall system administrator that maintains the core. This is also not a hard and fast distinction, however.

FIG. 2 shows the infrastructure of FIG. 1 in more detail. In particular, FIG. 2 illustrates various data structures used in the authentication process. In FIG. 2, the various clients are represented as 2010-1, . . . , 2010-$n$; gateways are represented as 3010-1, 3010-2, . . . , 3010-$m$; and two (by way of example only) aggregators are shown as 4010-1, 4010-$k$. At least in the embodiment shown in FIG. 2, an aggregator will typically communicate into each of the lowest level hash tree nodes within the core. Only two aggregators are shown in FIG. 2 for the sake of simplicity.

In one implementation, each client system that wishes to use the verification infrastructure is loaded with a software package or internal system routines for convenient or even automatic communication and submission "upwards" of digital information. The software package may include some application program interface (API) 2014 that transforms submitted digital records into a proper form for processing. A digital record 2012 created, selected, or otherwise input in any way is then submitted by way of the API 2014 to a software module 2016 that uses the digital data from the record 2012 as at least one argument in a transformation function such as a hash function.

Cryptographic hash functions are very well known in many areas of computer science and are therefore not described in greater detail here. Just one of many possible examples of a common class of hash functions that are suitable for use in this infrastructure are the various "secure hash algorithm" family (SHA-1, SHA-2, etc.).

Additional hashing within the client may be desired to include additional information depending on the design protocol of the infrastructure. Just a few of the many possible arguments the system designer might optionally choose to include as arguments of the additional hash function 2016 are an identifier of the person or entity requesting registration, an identifier of the particular client system being used, a time indication, information relating to the geographic location of the client or other system, or any other information desired to be incorporated as part of the registration request. A software module 2020 is preferably included to transmit the output of the transformation 2016 to higher layers of the infrastructure as a request (REQ), along with any other parameters and data necessary to communicate with a gateway and initiate the registration request.

It is assumed in this discussion that the transformation function 2016 is a hash function because this will be the most common and efficient design choice, and also because the properties of hash functions are so well understood; moreover, many different hash functions are used in the field of cryptology, security, etc., within commodity computers.

One other advantageous property of hash functions is that they can reduce even large amounts of digital information to a size that is more easily processed, with a statistically insignificant chance of two different inputs leading to the same output. In other words, many well-known hash functions will be suitable for use throughout this infrastructure, and can be chosen using normal design considerations. Nonetheless, the function that transforms digital records into a form suitable for submission as a request need not be a hash function as long as its properties are known. For example, especially for small digital records, it may be more efficient simply to transmit the digital record data as is, in its entirety or some subset; in this case, the transformation function may simply be viewed as an identity function, which may then also append whatever other additional information is needed according to the core system administration to form a proper registration request.

The data structure of a binary hash tree is illustrated within the gateway 3010-2. Each of the lowest level nodes will correspond to the transformed dataset 2018 submitted as a request from a client, along with any other parameters or data used in any given implementation to form a request. As illustrated, the values represented by each pair of nodes in the data structure form inputs to a parent node, which then computes a combined output value, for example, as a hash of the two input values from its "children" nodes. Each thus combined output/hash value is then submitted as one of two inputs to a "grandparent" node, which in turn computes a combined output/hash value for these two inputs, and so on, until a single combined output/hash value is computed for the top node in the gateway.

Aggregators such as the system 4010-1 similarly include computation modules that compute combined output values for each node of a hash tree data structure. As in the gateways, the value computed for each node in the aggregator's data structure uses its two "children" nodes as inputs. Each aggregator will therefore ultimately compute an uppermost combined output value as the result of application of a hash function that includes information derived from the digital input record(s) of every client that submitted a request to a gateway in the data structure under that aggregator. Although it is of course possible, the aggregator layer 4000 does not necessarily need to be controlled by the same system administrator that is in charge of the core layer 5000. In other words, as long as they are implemented according to the required protocols and use the correct hash functions (or whatever other type of function is chosen in a given implementation), then the client, gateway, and aggregation layers may be configured to use any type of architecture that various users prefer.

In one embodiment, the core 5000 is maintained and controlled by the overall system administrator. Within the core, a hash tree data structure is computed using the root hash values of each aggregator as lowest level inputs. In effect, the hash computations and structure within the core form an aggregation of aggregation values. The core will therefore compute a single current uppermost core hash value at the respective tree node 5001 at each calendar time interval t0, t1, ..., tn. This uppermost value is referred to here alternatively as the "calendar value" or "current calendar value" for the time interval. Note that the time origin and granularity are both design choices.

Note that the uppermost tree node 5001 represents the root node of the entire tree structure of nodes junior to it. As is explained later, this will change upon recomputation of a new uppermost core hash value at the end of the next period of accumulating requests and generating signature vectors ("also referred to as "data signatures") containing recomputation parameters.

As system designers will understand, the various computational and administrative modules within clients, gateways, aggregators and the core itself comprise computer-executable instructions that may be provided, stored, loaded and executed from any known computer-readable storage medium, including downloading the code over a network into memory or other storage units, on physical media such as CD-ROM or other disks, on optical or magnetic storage media, on flash or other RAM-based memory devices, etc.

In FIG. 2, certain ones of the hash tree nodes in the gateway 3010-2, the aggregator 4010-1, and the core 5000 are marked with an "X". Notice if one traverses the various tree paths upward from the value 2018 in the client 2010-1, it is possible to compute every value upward in the tree structures all the way to the most current uppermost core value 5001 given the values in the X-marked tree nodes (the siblings of the nodes in the direct recomputation path) and a knowledge of the hash functions applied at each successive parent node. In short, if a signature is associated with the digital record 2012 that includes all of the "X marked" values, and assuming predetermined hash functions (which may of course be the same or different functions), then re-computation of the hash values upward through all of the tree structures will yield the same value as in the current calendar value, but only if the starting input value representing the original digital record is in fact identical in every respect to the original. Even the slightest alteration to the digital input record of even a single bit in any of the values of the signature associated with a record 2012 will lead to a re-computed calendar value that is not identical to the one in node 5001. Note also that each uppermost computed value in the core—the current calendar value—contains information derived from every digital input record that is input into the system during the current calendar time interval.

Figure 3:
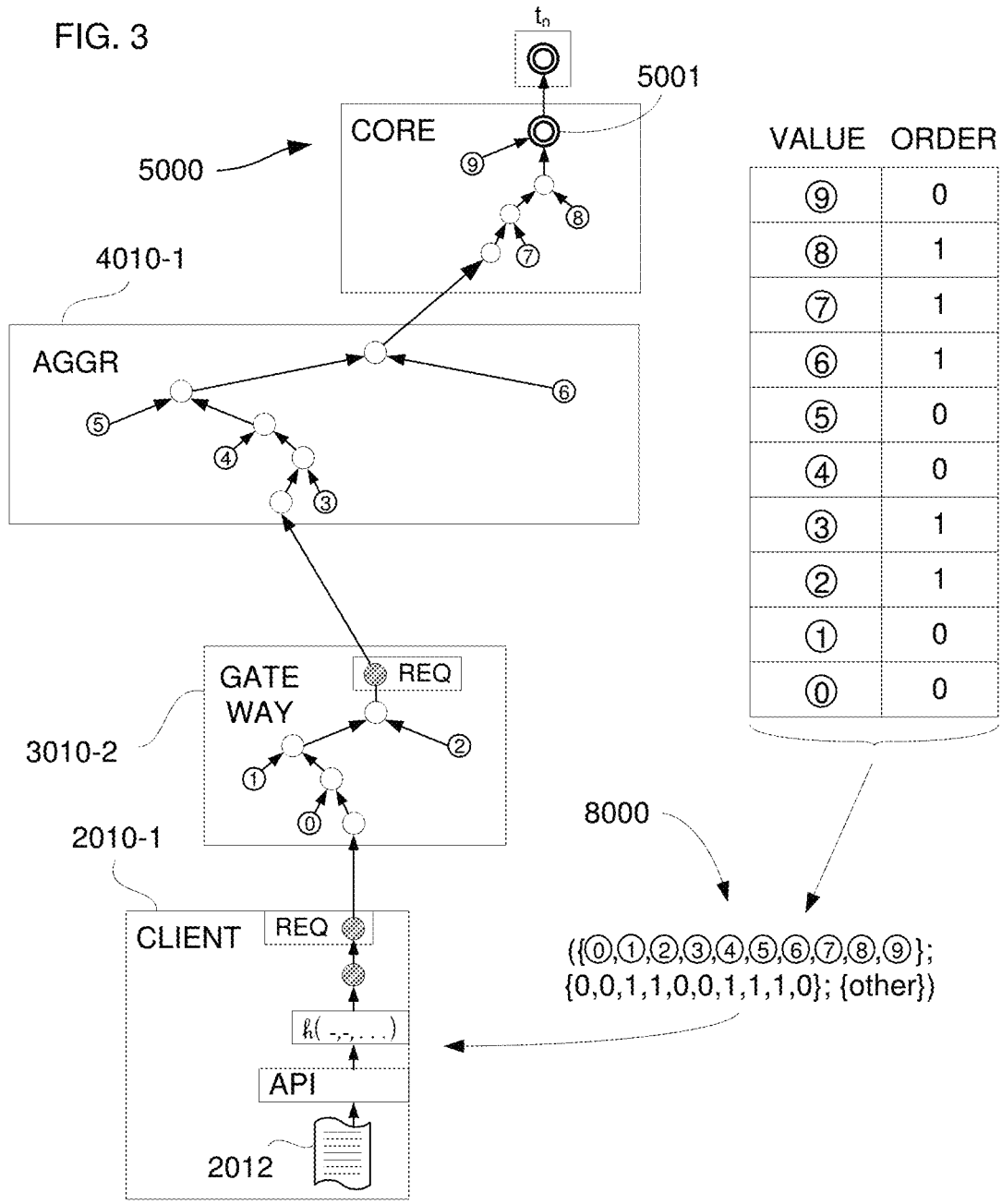

FIG. 3 illustrates the "reduced" infrastructure whose hash tree node values contain the information necessary to recompute the hash tree path all the way to the top of the system to the value in node 5001. It is not necessary for the recomputation to be carried out in any gateway, aggregator or the core; indeed, it is not even necessary for recomputation to take place within the same client 2010-1 that originally submitted the verification request for the digital record 2012. All that is necessary is the vector containing the "sibling" tree values at each level, as well as knowledge of which hash functions are used to compute each parent node. In other words, given this information, even a third-party would be able to perform the recomputation and compare with the node value 5001 and thereby either to authenticate any given representation of what is supposed to be digital record 2012, or to detect any difference.

In FIG. 3, the sibling hash values needed for recomputation are numbered 0-9. If nodes are created in time order, and if order is important in the chosen hash function, then whether a sibling at each level is to the "right" or "left" in the hash structure will be relevant. In the example shown in FIG. 3, not only the value but also the order (0: from left, 1: from right) is indicated in the vector ({sibling values 0-9}, {order bits},{other}) returned along with any other chosen information as the data signature 8000. At this point, one may see one advantage of using a binary hash tree structure: at each level, there will be only one sibling value needed for upward recomputation. Although a non-binary tree structure would be possible, one would then have to accept the increased computational, storage, and data-structural complexity. Comparing FIG. 2 and FIG. 3, one can also see that the computational burden to validate one of a set of N digital input records at any given time interval is proportional to only $\log_2 N$.

To increase independence of the various layers—in particular, clients and later entities wishing to perform authentication through recomputation—it is advantageous for the entire calendar to be passed to the aggregators and even to the lower layers, even as far as to clients, every time a new calendar value is computed, that is, at the end of each calendar time interval. This then allows delegation and distribution of the computational workload without any compromise of the integrity of the system. FIG. 1 therefore shows a database or file (the "calendar") 6000 that includes all calendar values from the beginning of system time. This would allow new aggregators, gateways and clients to join the infrastructure with minimal administrative burden and would enable recomputation and authentication of any digital record without having to involve levels higher than the client-level entity wishing to authenticate the digital record.

One advantage of the digital signatures provided by the Guardtime infrastructure as shown in FIGS. 1-8 (and even FIGS. 9 and 10 depending on how the blockchain is implemented) is that it may be possible for users to verify a data set totally independently, that is, without having to rely on any gateway or aggregator at all, since the signature vector for the data set will include the recomputation parameters for verification.

When the core computes the current calendar value 5001 at the new calendar time interval, it may return to aggregator 4010-1 its sibling (X-marked) lowest core node value from aggregator 4010-k, and the aggregator 4010-1 can then return downwards the X-marked hash values to the gateway 3010-2, which in turn can return downwards to the client 2010-1 all of the above, plus the X-marked hash values computed within that gateway's hash tree structure. In other words, not only may the hash computation infrastructure be distributed over various layers (vertically) and also "horizontally" at each layer, but the responsibility for communicating requests upward and partial or entire signature vectors downwards can also be distributed and can be carried out simultaneously in many different locations. Since a data signature is unique to the digital record that led to it, the procedure for returning a signature vector for each input digital record 2012 for client 2010-1 (note that a single client may input more than one digital record for verification in each time interval) is preferably duplicated for all digital input records received in the time interval over which values were accumulated for the computation of node value 5001.

The nature of the distributed infrastructure shown in FIG. 2 does not need to be static from one time interval to the next. Rather, each of the components below the core can be built asynchronously and independently of others; all that is needed for authenticating recomputation from a digital record up to the corresponding calendar value is the transformation function and other values that made up the original request, the vector of hash tree sibling values and knowledge of which hash functions are to be applied at each computation. Of course, the simplest case would be that the same hash function is used at every level. A somewhat more complicated choice would be to use the same hash function for all computations on a given level (within clients, within gateways, within aggregators, etc.) with variation between levels. Other even more complicated choices may of course be made as will be realized by those skilled in the art of such data structures and hash function computations. As long as the hash function used for each computation is known, the infrastructure will be able to validate a given input record.

In most cases, it is unlikely that the number of clients during a given computation interval will be exactly equal to a power of 2. Any known method may be used to adapt to the actual number of clients while still maintaining a binary hash tree structure throughout. As just one example of a solution to this, known dummy values may be used for all of the "missing" sibling node values. Alternatively, it is also possible to adjust the hash tree branches accordingly, in the manner of giving "byes" in single-elimination sports tournaments.

In one embodiment, the gateways 3000 may be more local to various clients whereas the aggregators are more regional. For example, it would be possible to locate aggregators in different parts of the world not only to distribute the workload, but also to increase throughput. Although it appears in FIGS. 1-3 that clients are associated with a particular gateway and gateways are associated with a particular aggregator, this is not necessary. Rather, client requests could be submitted over a network, and the first gateway that responds could then be associated with that client for that authentication transaction. Similarly, requests from gateways could be submitted to an open network and processed by whichever aggregator first establishes a connection. Locating aggregators and gateways both physically and logically in an efficient manner will therefore typically better distribute workload and reduce latency. This may not be desired in other implementations, however. For example, entities such as the government, defense contractors, or companies that wish to maintain strict security and tight control of the entire infrastructure could control and specify the relationship between all of the layers of the infrastructure, or any subset of these.

Assume now by way of example that some entity later wishes to verify that a digital record in question—a "candidate digital record"—is an identical copy of digital record 2012. Applying the same transformation function 2016 to the candidate digital record and recomputing upward using the corresponding data signature 8000, the entity should compute to the exact same calendar value that resulted from the original digital record's registration request. In some implementations, this level of verification is sufficient. As one possible example, if the calendar is distributed to enough independent aggregators, then if one malicious actor were to tamper with some calendar value, this could be detected if some procedure is implemented to compare with other copies of the same calendar.

As another example, in some implementations, users may choose or be obligated to rely on the security of the administrator of the core. In particular, government entities might implement a system in which users must simply rely on the government administrators. In these cases, recomputation up to the corresponding calendar value may be considered sufficiently reliable authentication. In the context of this infrastructure, this can be viewed as "first-level" verification. One hypothetical example of where such a system might be implemented would be where a government agency requires companies, laboratories, etc. to submit a copy of its calendar to the government entity every time the company's system updates its calendar. The government would then be able to audit the company's records and verify the authenticity of any given digital record by recomputing up to the proper calendar value, which the government will have stored. In practice, this would amount to requiring the company to keep updated a "calendar audit trail" with the auditing entity (such as the government).

Even in other instances, as long as the highest level system administrator trusts its ability to securely store calendars, it could be satisfied that a candidate digital record is authentic if recomputation leads to the appropriate stored calendar value. In a sense, it would be the system administrator itself in such cases that is looking for proof of the authenticity of candidate digital records as opposed to clients or other third-party entities. Consequently, the system administrator could trust the security of the recomputation and calendar values to the same extent it trusts itself to maintain the calendar copies.

All but the last digital record requesting registration in a calendar time period will typically need to wait for all other requests in the calendar time interval to be processed before a calendar value will be available that will enable authenticating recomputation. If the calendar time interval is kept short enough, this delay may be acceptable. To increase the level of security during the delay, it would also be possible to implement an option, whenever a client submits an authentication registration request, to generate and return not only the data signature vector but also a key-based signed certificate, which may be issued by any higher layer system such as the current gateway, aggregator, or even core.

Figure 4:
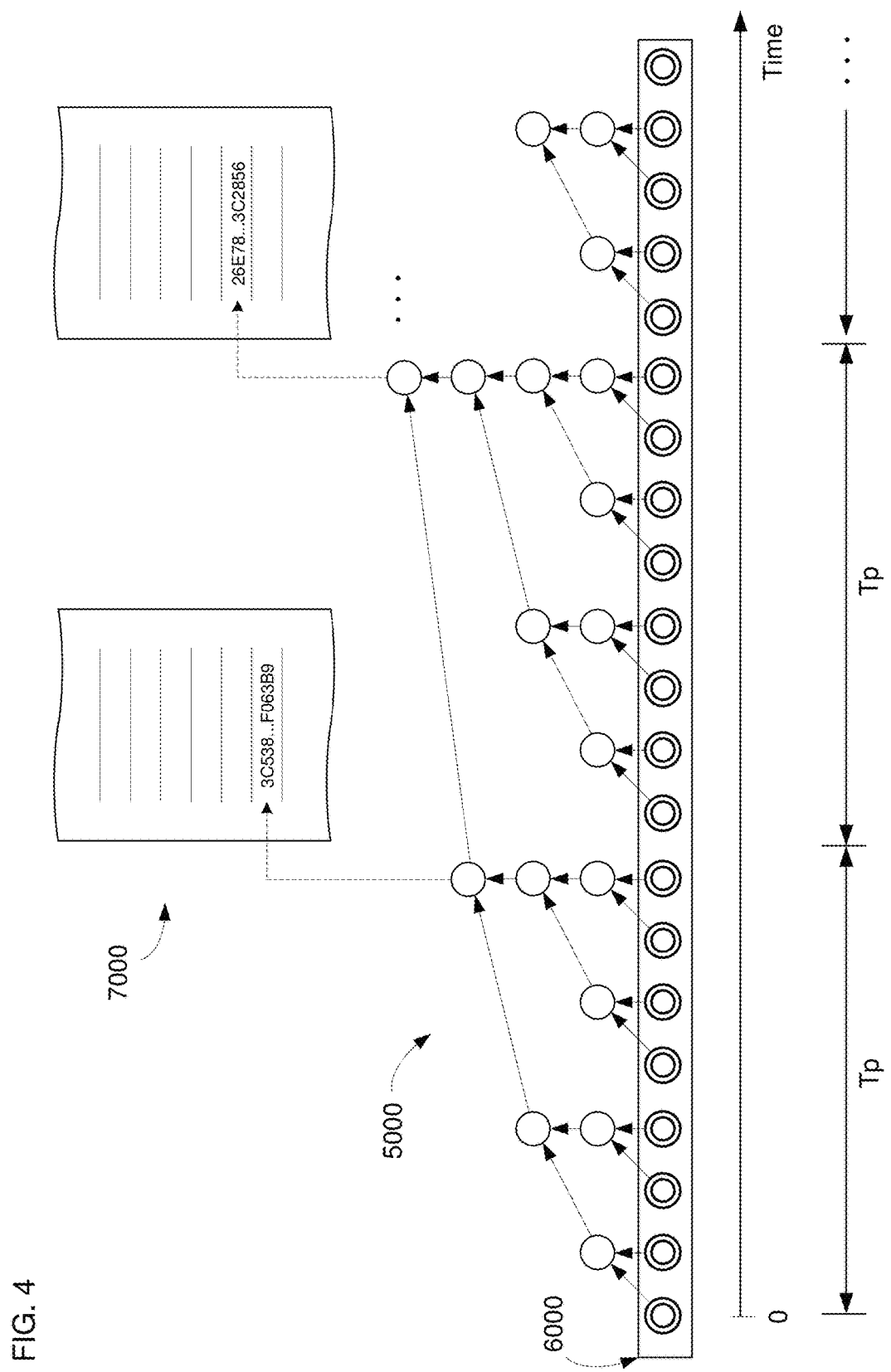

FIG. 4 illustrates an extension of the basic calendar-reliant verification process that provides "second-level" verification that is a method for permanent verification with no need for keys or trust of any entity, not even the administrator of the core. In FIG. 4, all of the calendar values computed over a publication time interval Tp are themselves used as inputs to an additional hash tree structure that is preferably hashed together (for example, using a known Merkle tree structure) with previous calendar values to compute a composite calendar value (a "publication value") that may then be submitted for publication in some medium 7000 such as a newspaper, online posting, etc., that forms an unchangeable record of the composite calendar value. Here, the term "unchangeable" means that it would be practically impossible for even the most malicious actor—even if this is the core administrator—to alter every publicly available occurrence of the value. It is not necessary for "published" to be in any medium accessible to the general public, although this is of course one option that removes all need for a trusted authority; rather, a large or perhaps closed organization that implements the entire infrastructure on its own might simply choose to keep a database or journal of the composite calendar values in some secure logical or physical location.

Because of the various data structures and procedures of the distributed infrastructure, the published composite calendar value may encode information obtained from every input digital record over the entire publication time interval, and if the current calendar value for the current calendar period is hashed together with the previous one, which is hashed with the one before it, and so on, as shown in FIG. 4, then each published composite calendar value will encode information from every digital record ever submitted for registration from the beginning of calendar time at t0. This guarantees the integrity of the entire system: Changing even a single bit in a single digital record registered in the past will cause a different publication value to be computed, which would then not match the actual publication value. Once the composite signature value (that is, the publication value) is published, there is never again any need to temporarily associate any signed digital certificate (which might be provided as before to increase security until the composite value is published, at which point it will not be needed) with the signature vector of the corresponding digital input record; rather, using the data signature vector and the calendar values (which are advantageously stored in each of the aggregators), one can then recompute hash values upward from any digital input record all the way to the published value. If the digital input record used in such recomputation leads to a match with the published value, then one can be certain to within the degree of certainty of the hash functions themselves that the digital input record being tested is identical to the one that originally received the corresponding signature vector.

Figure 5:
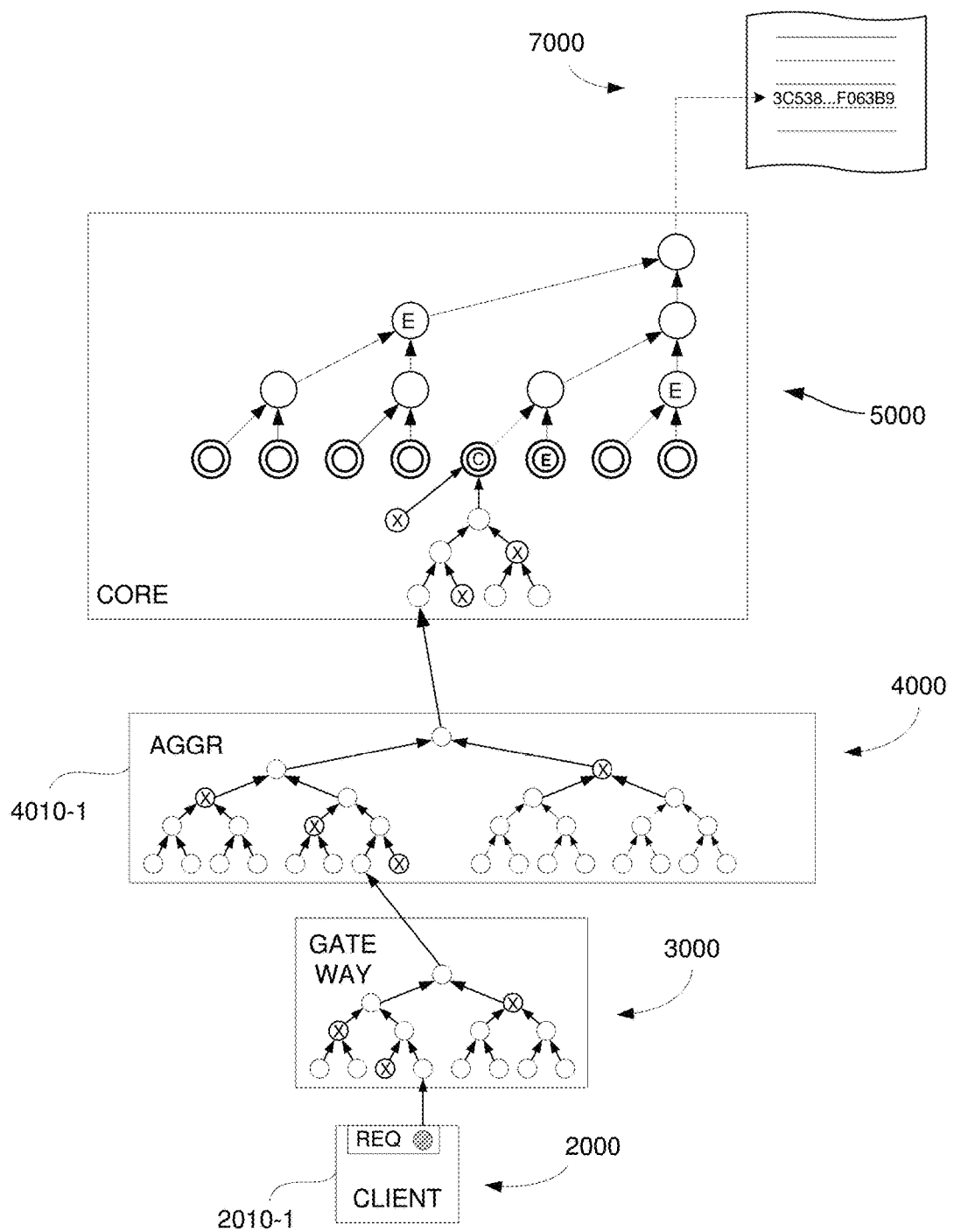

FIG. 5 illustrates an optional extension of the signature vector to include the values obtained during computation of the publication value as well. Assume as before that the "X-marked" nodes are the sibling hash values for the digital record corresponding to the request REQ from client 2010-1. The X-marked values are sufficient to recompute the calendar value marked "C", but the hash values in the nodes marked "E" in the data structure (in FIG. 5, the Merkle tree structure) within the core that converts calendar values into the publication value are necessary to recomputed all the way up to the published value 7000. At the end of the calendar period, the core therefore preferably extends or augments the signature vectors to include the "E" values, along with corresponding order bits as previously. With such an extended signature, any party can verify the authenticity of a given digital record as long as it has the extended signature vector, knowledge of the hash (or other) functions used, and the corresponding publication value—if recomputation leads to a match, then the digital record must be identical to the original; if not, then something has been altered. Note also that any change of order in the time of receipt for any two digital input records will also affect the computed values in the core as well as the published composite signature value.

In FIG. 4, eight calendar values are shown in each publication time interval Tp. In other words, in the illustration, the number of calendar time intervals in each publication time interval Tp is conveniently a power of 2. This may not be so in other implementations, depending on the choice of intervals. For example, if a calendar value is generated each second, but publication occurs only once every week (604,800 seconds), then there will not be a power of 2 number of calendar values as leaf nodes of the Merkle tree structure. As in other trees, this can be handled in a known manner as in giving "byes" in single-elimination sports tournaments by adjusting the tree branches, by using "dummy" inputs, etc.

Although it may in many cases be desirable or even required for the published value to encode information from the entire calendar from the beginning of calendar time, other alternatives can also be implemented as long as suitable bookkeeping routines are included. For example, rather than include all calendar values in the Merkle tree, at each publication time all of the most recent calendar values could be included in the publication computation along with a random sampling of calendar values from previous intervals. This would be one way, for example, to ensure that the number of included calendar values is conveniently a power of 2.

Similarly, in some contexts, government authorities require proof of records extending back only for some given time such as three years. In such cases it might be advantageous always to include only calendar values generated during this required period such that only relevant digital records are encoded in the most recent publication value.

Another alternative would be for there to be only a single computation of the publication value, including all calendar values from the beginning of system time. This might be useful, for example, in projects with clear time or digital record limits. For example, in litigation or transactions, parties often submit digital records to a "data room" for easy exchange. Calendar values could then be generated periodically as in other cases (perhaps with a longer calendar time interval since digital records will generally not be submitted as frequently as in large-scale, universally accessible implementations of the infrastructure's infrastructure), but with only a single computation of a publication value when all parties agree to close the data room. The publication value would then be a form of "seal" on the body of submitted digital records, which could later be used for recomputation and verification of any digital record ever submitted into the data room.

It is not absolutely necessary for the publication value to be computed using the Merkle hash tree data structure illustrated in FIG. 4. One alternative might be, for example, that all calendar values over the publication time interval are concatenated and then hashed as a whole together with a pseudorandom number, which then becomes part of the extended data signature vectors.

It is not a requirement for systems in any given layer to apply the same hash functions. For example, the transformation functions used in different client systems could be different. As long as the functions at each place in the recomputation path are known to whoever later wants to authenticate a digital record through recomputation, the authentication process will work properly. Adding a hash function identifier as an input parameter to the preparation of the registration request would be one convenient way to enable future users to correctly authenticate a digital record through recomputation.

The general verification infrastructure thus allows for provable authentication of particular documents, but the described data signature does not necessarily encode data that identifies which entities (such as which gateway(s), which aggregator(s), etc., took part in the registration of the document in the system, that is, in the creation of the document's data signature. As long as the hash function is known at each node of the tree, as well as the other immediate child of the node and, if the hash function inputs are non-commutative, the order (for example, left, right), it will be possible to verify a document using recomputation regardless of any information specific to the originally computing entities.

Figure 6:
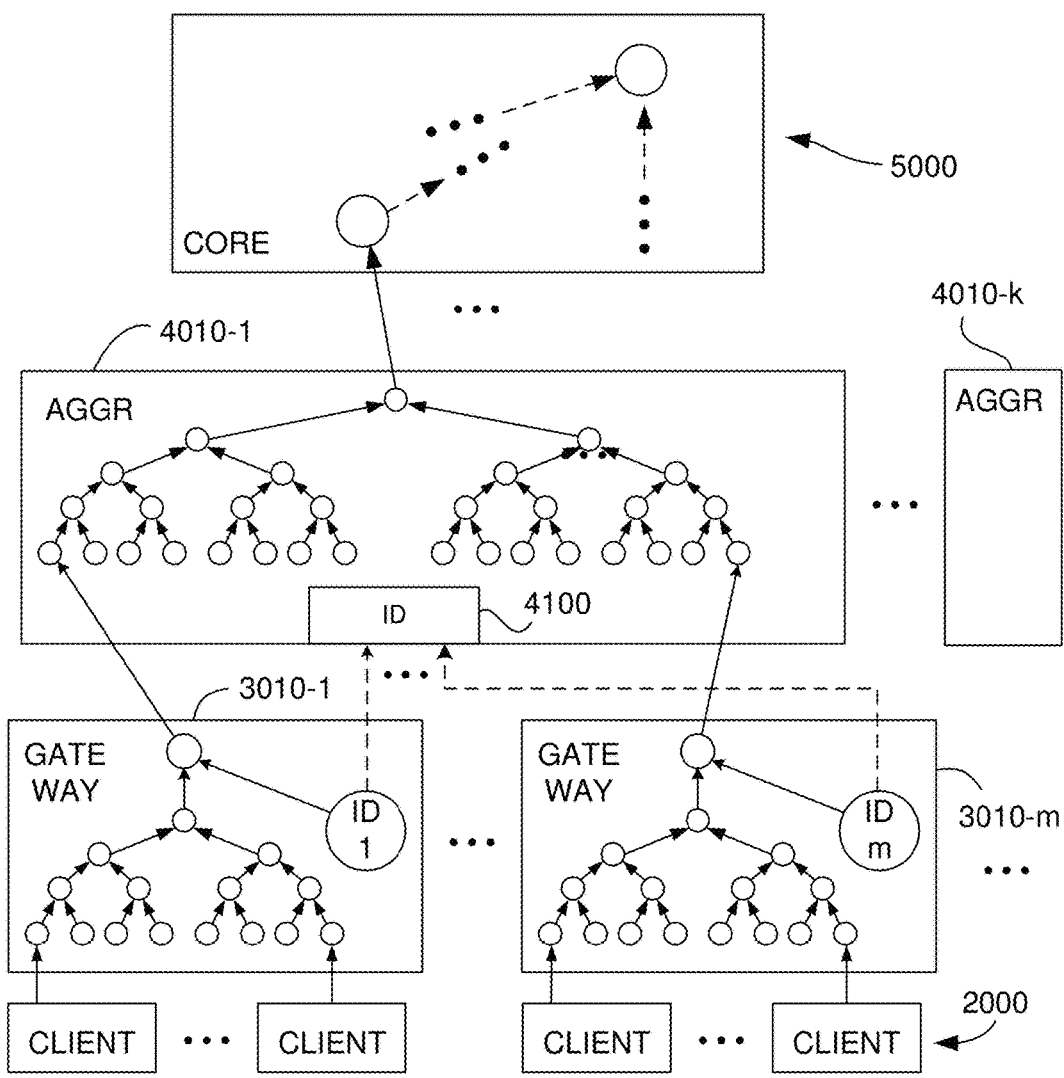

FIG. 6 illustrates a "self-ID embodiment" in which all or at least some of lower-level entities (in the illustrated example, gateways 3010-1, . . . , 3010-$m$) each include either a memory/storage value or other component ID1, . . . , IDm, respectively, that encodes an identifier for the entity. The identifiers may have a standard format, or may be generated by each entity according to its own conventions, as long as each identifier is in the proper form to be hashed together with the uppermost value (for example) of the sub-hash tree computed within the entity. In other words, the value passed "upward" in the hash tree from each such entity to the entity immediately superior to it in the tree hierarchy will be a hash of the otherwise computed uppermost value and the entity's identifier. The result of this augmentation of the hash tree computation with the ID "nodes" ID1, . . . , IDm is that the data signature for every document in the hash tree below the level of each respective entity will encode the identifier for that entity. Recomputation for verification of each such document will therefore require knowledge of the proper ID value ID1, . . . , IDm. In other words, successful recomputation will necessarily involve identification of each entity in a document's recomputation path for which an identifier node is implemented. (More than one entity in a path may have its own unique identifier.)

As FIG. 6 illustrates, the identifier ID1, . . . , IDm for each entity is preferably communicated upward to the next higher entity, which may include a storage component 4100 to keep track of the identifiers of the entities that "report" to it, that is, of its "child" entities. Although not strictly necessary for document-verifying recomputation, this will often be desirable for administrative and security reasons.

For administrative ease, the identifier for each entity may be fixed, but this is not necessary. For example, identifiers for an entity could be generated or changed according to a schedule, or according to some generating function, or even randomly, or include a time marker, as long as the identifier in use for the computation of a given data signature is known and associated with the entity at the time it was in use. The set (possibly time-varying or dependent on other designer-chosen parameters) of identifiers is then preferably maintained in the parent entity, such as in component 4100 for the sake of identity validation if necessary.

It is also not necessary for the component that generates or otherwise provides the identifier for a given entity to be a purely software component such as a memory or storage location or the output of a computation module. For example, the identifier for a gateway could be stored and encoded or generated in a hardware security key 3012 (FIG. 8), such as a "token" or "dongle", magnetically, optically, RFID or otherwise encoded ID tag or badge, or even simply in a flash or similar memory device. Note that such a key would not be a "key" in the sense of PKI, so the infrastructure as such would still be keyless in the cryptographic sense; rather, the hardware key would function merely to input an identifier. It would be possible, however, for the identifier itself to be a PKI signature; the overall infrastructure would still not depend on any system of private/public keys. Additionally, it would also be possible that, in using PKI-based signing in the identifier, a HSM (hardware security module) could also be included that may demand a password or some biometric authentication, for example, to be re-enabled after a reboot of the respective entity. Regardless of the chosen implementation, such an "externally" provided or influenced identifier (in whole or in part) could function as a key to "unlock" or "activate" a particular entity in a registration path—for example, without insertion of the key with a valid (determined in any known manner) identifier, a gateway could be disabled from participating in document registration.

The identifier ID1, . . . , IDm could also be an input entered by an operator via a keyboard or other type of console 3011 (FIG. 8), thereby functioning as a form of identifying password that participates in the uppermost hash operation of an entity. The identifier could therefore encode not only information identifying the hardware entity (such as the server that implements a gateway or aggregator, etc.), but also the individual who has activated the entity for participation in the hash tree infrastructure. The identifier for an entity could also be provided by another entity higher up in the infrastructure hierarchy, for example, by an entity's parent (such as by an aggregator to a gateway, or even by the overall system administrator to all member entities in the infrastructure). Even in such a case, however, the configuration illustrated in FIG. 6 is referred to here as "self-ID augmentation" of the hash tree with an identifier node because the hash computation that involves the entity's identifier node occurs within the entity itself.

Figure 7:
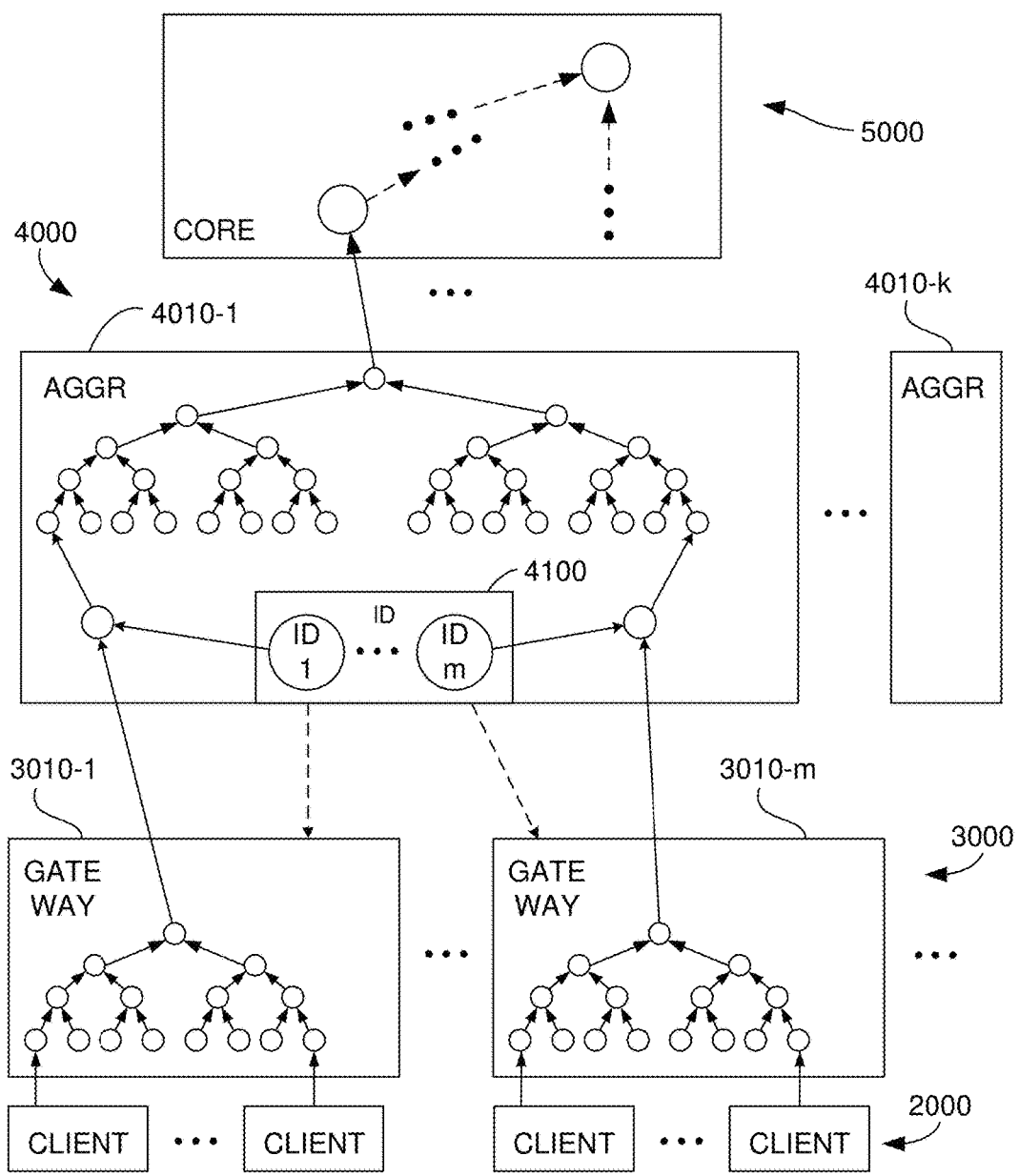

FIG. 7 illustrates an "assigned-ID augmentation" embodiment of the hash tree infrastructure. In this embodiment, the identifier for each child entity that is to be provided with one is assigned to the entity by its parent. In the example shown in FIG. 7, the identifiers ID1, . . . , IDm for gateways 3010-1, . . . , 3010-m are assigned to them by their common aggregator 4010-1. In this embodiment hashing of each identifier with the respective uppermost value of each gateway (the child entity in the illustrated example) occurs in the aggregator (the parent entity). As indicated by the dashed arrows, the parent entity may communicate the identifier for each entity to that entity, although this would not be necessary to enable authenticating recomputation for a candidate document (digital record). Thus, in this embodiment, all entities up to the level that assigns identifiers may function as before, possibly not even aware that they are identified within the data signatures of digital records in whose computation/recomputation paths they lie. Note that at least the network identity of child entities will be known to parent entities as a consequence of standard network protocols. Other known techniques may also be used over the network connection to identify the child entities, which will typically be servers.

Although hash node augmentation is illustrated in gateways and lowermost aggregators, respectively, in FIGS. 6 and 7, it may of course be implemented at any level, and indeed in more than one level at a time. Each identifier, when included in a data signature, will encode one part of the registration path in the hash tree for the digital record the data signature is associated with. The more entity identifiers are included, the more the path will be provably included in a data signature.

Figure 9:
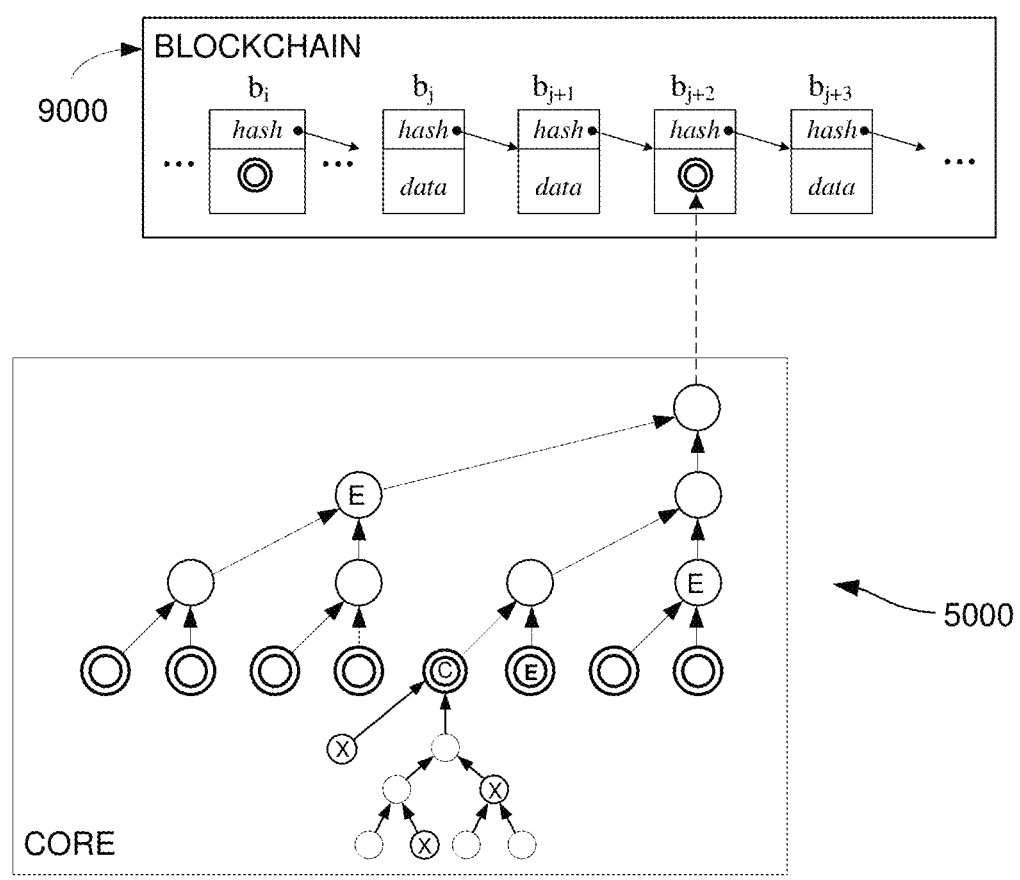
Figure 10:
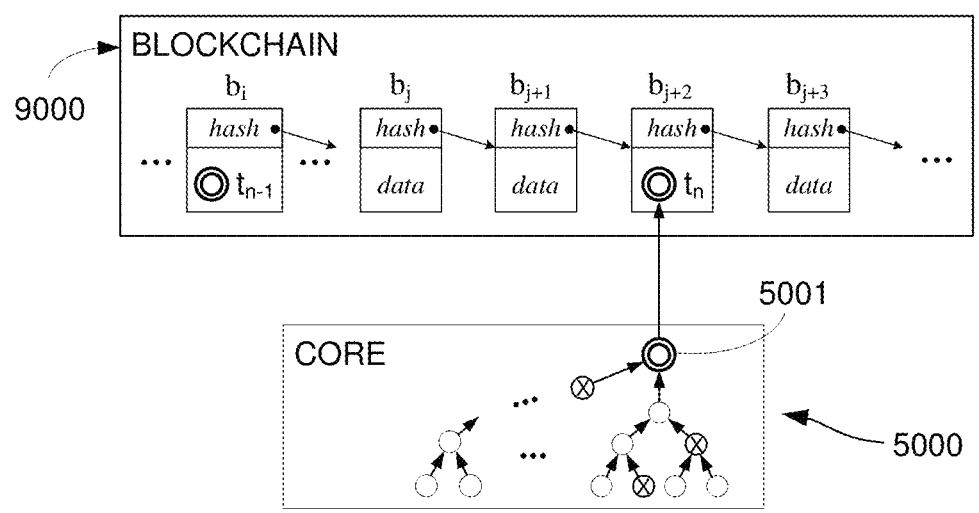

In the embodiments shown in FIGS. 4 and 5, the calendar values during a calendar period are combined in the Merkle to produce a composite value that may be published in some unalterable form, such as a physical or electronic medium or data structure, such as in print (such as a newspaper, many copies of which are widely distributed), in a widely distributed or witnessed database or web-based entry, etc. Here, "unalterable" means that it cannot be changed without detection, that is, that the mathematical or physical difficulty of tampering with data without being detectable is so great that no reasonable person would doubt the result of the verification/detection scheme. FIGS. 9 and 10 illustrate an embodiment in which the "medium" is a data structure that can be widely witnessed, and, as such, practically impossible to tamper with without detection. One such data structure is known as a "blockchain" 9000. Although the term "blockchain" itself, as well as related terms, do not yet have universally accepted definitions, typically a "blockchain" is understood as being a data structure comprising a series of usually (but not necessarily) time-stamped blocks $b_i, \ldots, b_j, b_{j+1}, b_{j+2}, b_{j+3}, \ldots$, where each block includes data corresponding to one or more transactions, hashed together with linking data, such as the hash output, of an immediately preceding block. The chain can then be used to create a public ledger, which is typically an append-only database achieved by distributed consensus of multiple participants. Once data is entered into a block of the chain, the entry is essentially irrefutable, since any tampering with the data would be reflected in the chained hash calculations and is thus easily detected.

One current point of dispute when it comes to the concept of a "blockchain" is whether, by definition, any entity may be allowed to submit blocks to and verify blocks in the blockchain, possibly only upon meeting some proof-of-work requirement (such as Bitcoin's "mining"), or whether the entities that may submit to and verify blocks in the data structure must be permissioned by some central authority. In other words, there is dispute as to whether "blockchain" by definition implies "open" or not. Embodiments of this invention do not presuppose or require either definition.

In FIG. 9, the composite calendar value for each calendar period is entered, using any appropriate mechanism, for example, using proof-of-work, other multi-entity consensus, by permission, etc., for the chosen type of blockchain, as a block in the blockchain. Especially in the case of an open blockchain, there will then in general be no need to trust any entity at all, not even someone who presents a copy of a newspaper, or maintains a database.

Some blockchains have a non-trivial settlement time. For example, there may be a delay on the order of ten minutes for an updated state of a Bitcoin blockchain to be accepted. In such cases, it may be preferable to consolidate several calendar values and submit this as a single transaction. One way to do this is already disclosed above: The composite calendar value formed as the root of the Merkle tree in the core 5000, as shown in FIG. 9, is itself a consolidation of several calendar values. Thus, the composite value may be the transaction submitted at the end of each period Tp. The period Tp may then be adjusted according to the blockchain settlement time.

Assuming the blockchain can be appended to fast enough, it would also be possible to submit each calendar value as a separate transaction to the blockchain. This alternative is illustrated in FIG. 10. In these cases, use of a Merkle tree to consolidate calendar values into a composite value may not be necessary, and the Merkle tree computations in the core could be eliminated—in essence, the blockchain could serve the function of the calendar itself.

Regardless of which values (each calendar, or composite calendar) are submitted as blockchain transactions, the signatures distributed to users may be extended to include parameters identifying, for example, the respective transaction, that is, block, in the blockchain in which the user's input's calendar value was a part. Given a purportedly true copy of the original input record, its corresponding signature, and this blockchain-identifying information, one would then be able to verify the signature up to the level of the calendar value, and onward to the blockchain, thereby totally verifying (or confirming alteration of) the input record.

It is not necessary for the node identifiers to be static; rather, to make it even more difficult for any malicious actor to fake the identity of, for example, a gateway or an aggregator, the node identifier could be a digital combination, such as a hash, of a static identifier and some additional value(s). For example, the identifier could be made a function of time, such that it changes on a schedule, or even every calendar period. As another example, the identifier could be combined—or consist of—a nonce that it receives from the core, or from some other higher-level entity in the computation path, after authorization (for example, using a challenge-response or other mechanism) to participate in signature-generating computations during some period, such as the current calendar period, publication period Tp, etc.

Identity Strengthening

Figure 11B:
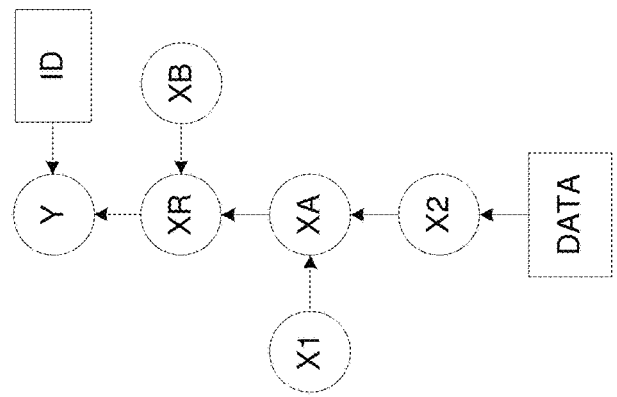
Figure 11A:
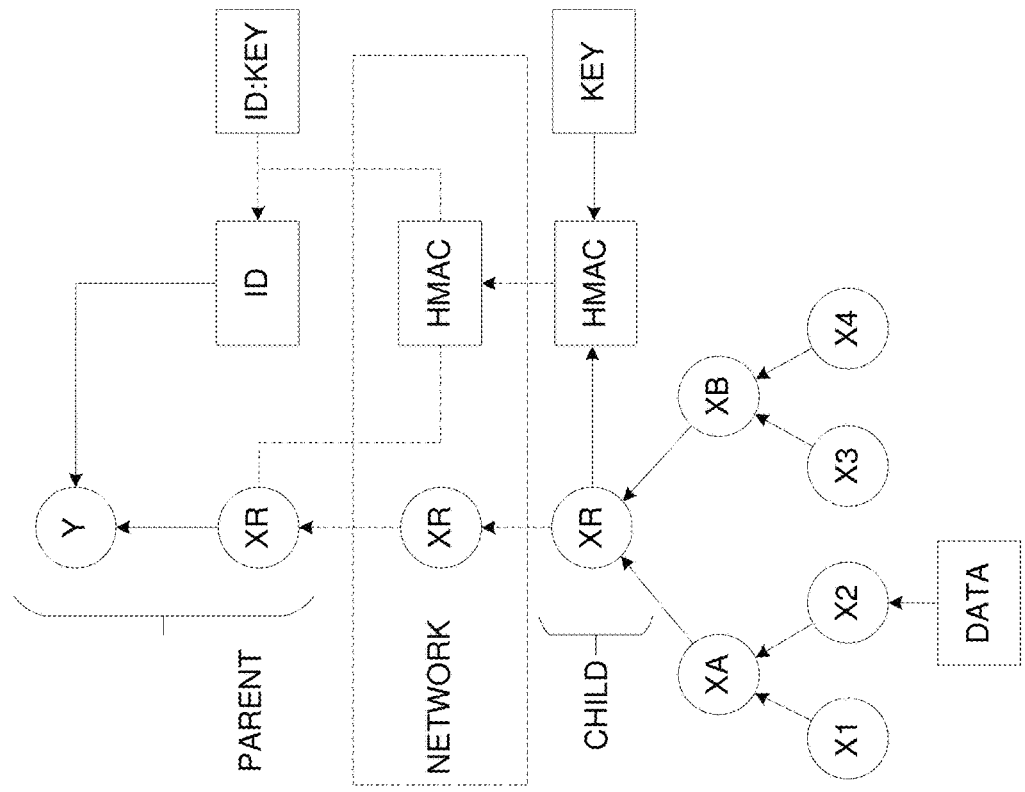

One method for identifying entities in the signature infrastructure and linking the identities into hash chains (for example, a calendar such as shown as block 6000 in FIG. 1, a "standard" blockchain 9000 as shown in FIG. 9, etc.) is illustrated in FIG. 11A. In FIGS. 11A-15B, a "child" entity (CHILD) is passing its value upward to a "parent" entity (PARENT). In other words, a child entity is the computing node immediately below another—the "parent" entity"—, to which the child passes a value (a "request") that is to be mathematically combined (for example, via hashing) with at least one other value in the hash tree signature infrastructure, such as illustrated in FIG. 1. For example, a "child" could be a gateway server passing its highest-level value upwards to another, immediately superior gateway server or to an aggregator server, an aggregator could be passing its highest-level value upwards to another aggregator or to a blockchain or the core 5000, or user-level or user-controlled entities could be creating aggregating hash trees of their own, and passing their highest-level values as requests upwards to a gateway.

Note that, regardless of the entity, each node in the hash tree (FIG. 1 and onward) represents the "top" of a portion (which may be any portion from a single node up to and including the entire structure) of the total hash tree. In other words, each node is the top ("root") of a "sub-tree" having any number (one or more) of leaves, whereby the sub-tree represents an aggregation of all the input values whose tree paths lead up to the sub-tree's root value. Thus, in FIG. 11A, nodes X1, X2, X3, X4 correspond to requests (2020 in FIG. 2) derived from "raw" inputs (labeled DATA in FIGS. 11A-15B). X1 and X2 are thus hashed to form XA; X3 and X4 are hashed to form XB; and XA and XB are in turn hashed to form XR, which is the "root" of the tree beneath CHILD entity. Note it is also possible, for lowest-level entities, to have a "tree" consisting of only a single input. In other words, CHILD may send a single value upwards to the its PARENT, which represents no "aggregation" at all on the part of the CHILD entity.

In the embodiment of FIG. 11A, the entity CHILD computes a hash message authentication code (HMAC) on the request using a key (KEY) it shares with its parent entity (PARENT in FIG. 11A). CHILD sends the request (which contains XR, the root hash value of CHILD's aggregation tree, and any optional helper fields, depending on the design) and the HMAC to PARENT, via whatever network (NETWORK) the two entities communicate over. PARENT verifies the received request and HMAC using a corresponding key (ID:KEY) (which may be the shared key, or the public one of a public-private key pair) and copies any parameter computed in any known manner to be indicative of the corresponding ID (including the "raw" ID value itself) into the upward hash computation chain. The value ID may be computed in any known manner given the key ID:KEY and given the HMAC value. PARENT hashes CHILD's aggregation root hash XR and CHILD's ID into Y, which becomes a leaf in PARENT's aggregation tree. Note that, in the illustrated case, the ID is that of the child and not of the parent itself, but it would also be possible for the key ID:KEY and resultant ID value to be associated with the receiving parent entity instead. The resulting effective hash chain segment for the input DATA is shown in FIG. 11B and has the value of the ID as the sibling data on the hash step that produces Y. This means the ID can't be changed or removed, since it will be part of the signature parameters for all signatures for inputs that lead to the CHILD entity.

Data Structure for Signing Aggregation Hashes

Figure 12C:
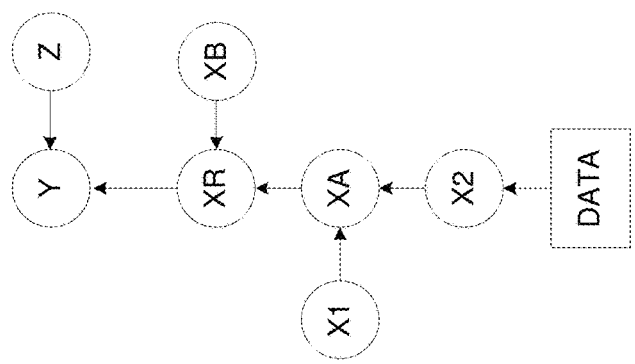
Figure 12B:
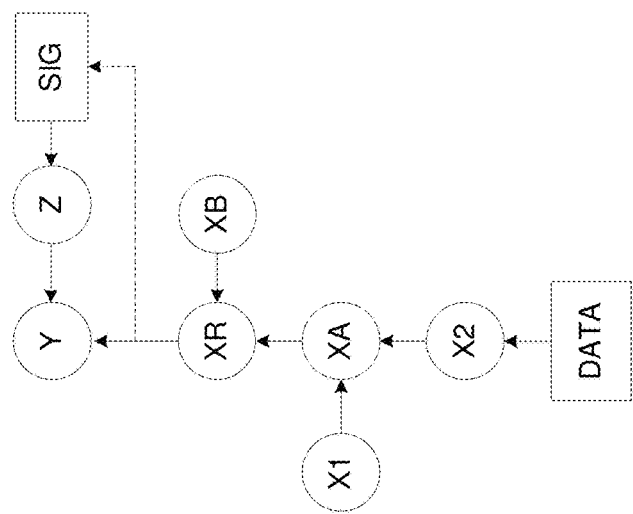
Figure 12A:
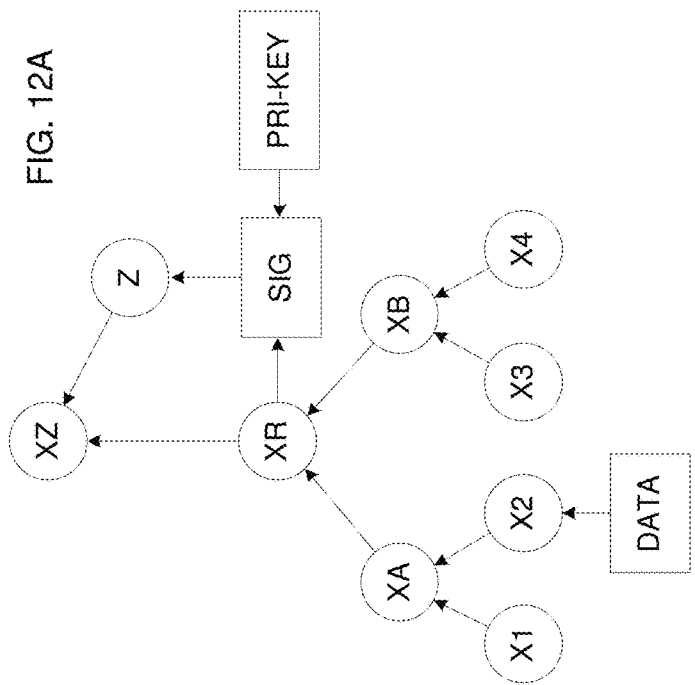
Figure 13B:
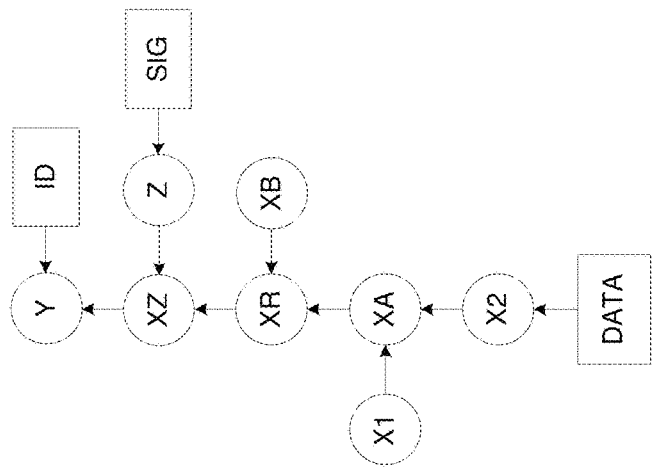
Figure 13A:
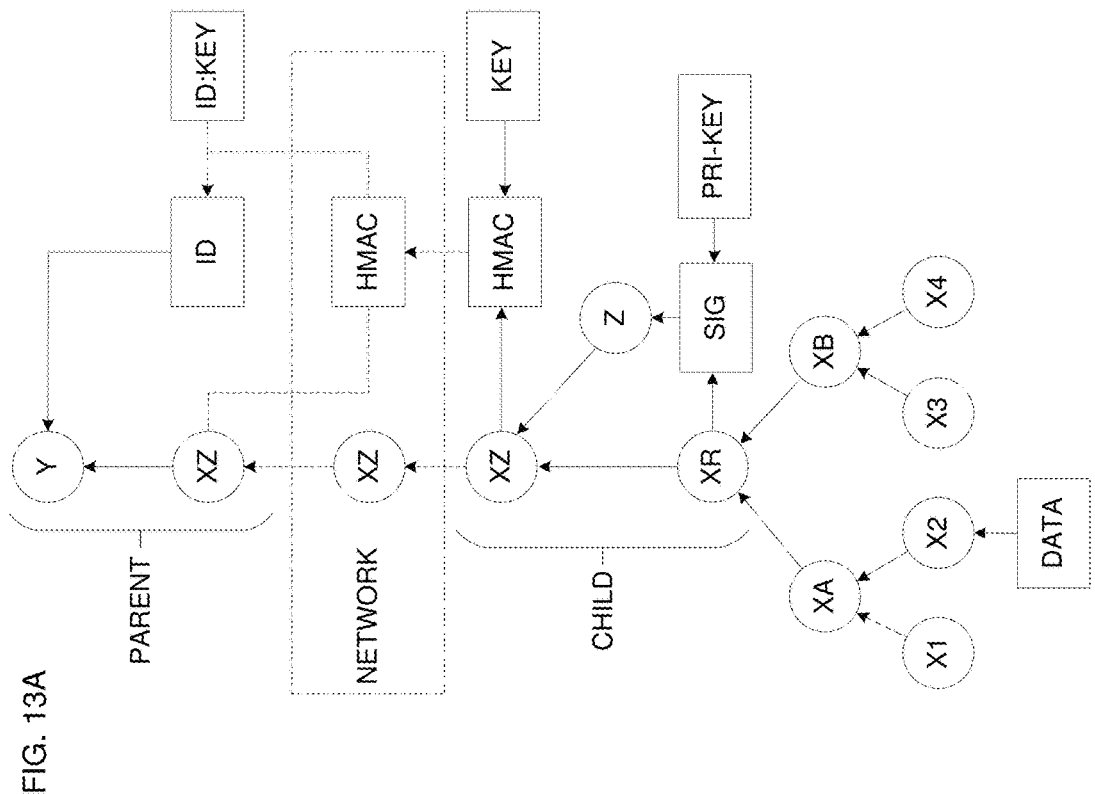

The general data flow for an entity to sign a hash value in its aggregation sub-tree is illustrated in FIG. 12A: After the node to be signed has been computed (typically the root of the local aggregation tree, XR in the figures), it may be signed (yielding the value SIG) using a private key (PRIKEY) associated with that entity. Here, the signature SIG represents an entity signature, which is not the same as the data signatures (or signature vectors 8000) returned for verification of a digital input record.

Although the signature SIG could be hashed directly with XR, it is preferably first itself hashed (yielding value Z in FIG. 12A) and the result may then be hashed together with the signed node XR to produce XZ, which then is used as the "leaf" value of and representing the child, which the parent entity can then hash with the leaf value of another child entity to form the parent's output node value, which it then submits upwards as its own request. Alternatively, XZ itself could be submitted as the parent node's uppermost value. Hashing SIG first makes it possible to remove it (and also the private key) without affecting the recomputation parameters in the later signature vectors 8000. Compared to the regular child-side portion of the hash chain (the part up to XR in FIGS. 11A and 11B), the resulting computation hash chain has one more step (producing the node XZ from XR and Z in FIG. 12B). Note that the signature SIG authenticates the node XR, while the node XZ (and the following ones upward in the computation chain) protects the immutability of the signature. The calendar hash chain (or blockchain value) on top of the aggregation hash chain in turn also time-stamps it. Also note that while the signature SIG can't be changed or replaced, it can be removed (see FIG. 12C), turning the node Z into an ordinary sibling hash (an identify leaf), but not invalidating the hash chain.

Signing on CHILD Side

Signing of nodes of the aggregation hash tree may be performed in this manner entirely by the CHILD entity, with the parent entity completely unaware of the added functionality. In this integration scenario (FIG. 13A), the node XZ computed from the root XR of the child entity's aggregation tree and the hash of the signature Z may be included in the request sent from CHILD to PARENT and HMACed as usual. PARENT performs the usual HMAC verification and adds CHILD's ID to the hash tree by hashing the ID value with XZ to produce the value Y, which may then be used as the "leaf" value of and associated with the child; Y may then be hashed with the leaf value of another child to form the output node value of the parent, or Y may itself be submitted as the parent node's uppermost value. This results in a hash chain (FIG. 13B) that contains both CHILD's signature and PARENT's attestation about CHILD identity. Note that the signature element SIG is linked into the chain indirectly via its hash value Z and can be removed (as in FIG. 12C), but the identity element ID is linked directly and can't be removed, since it constitutes a "leaf" value that will be included as a recomputation parameter in signature vectors. Note that in such an integration case, the CHILD entity could be signing an internal node of the aggregation tree and then the hash chains for leaves under the signed internal node will be covered by the signature while hash chains for leaves in other branches of the tree will bypass it.

Signing for Authentication

With the CHILD entity producing entity signatures on the root hashes of its aggregation sub-trees, it would be possible to use those for request authentication as well. In such a scenario (FIG. 14A), CHILD would send the aggregation root hash (as in the basic case in FIG. 11A), accompanied by the signature (instead of the HMAC). PARENT would then need the corresponding public key to verify the signature, and upon successful verification, would link the signature and the received root hash to produce the node XZ to be included in PARENT's aggregation tree.

Figure 14B:
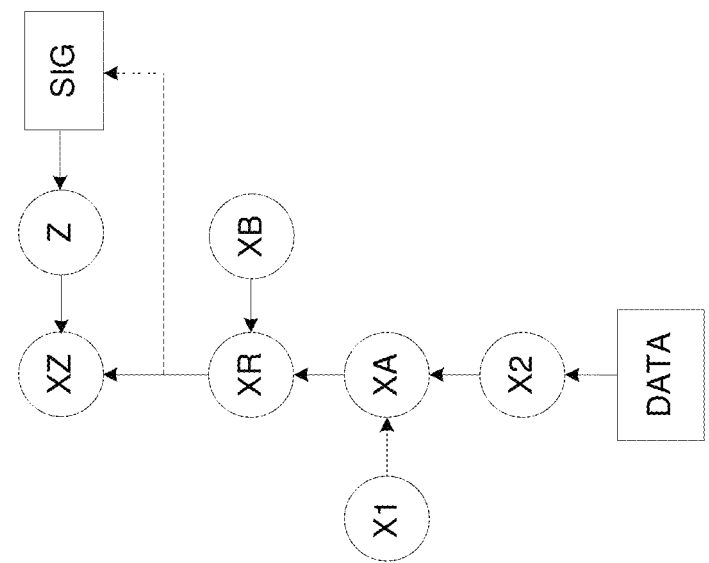
Figure 14A:
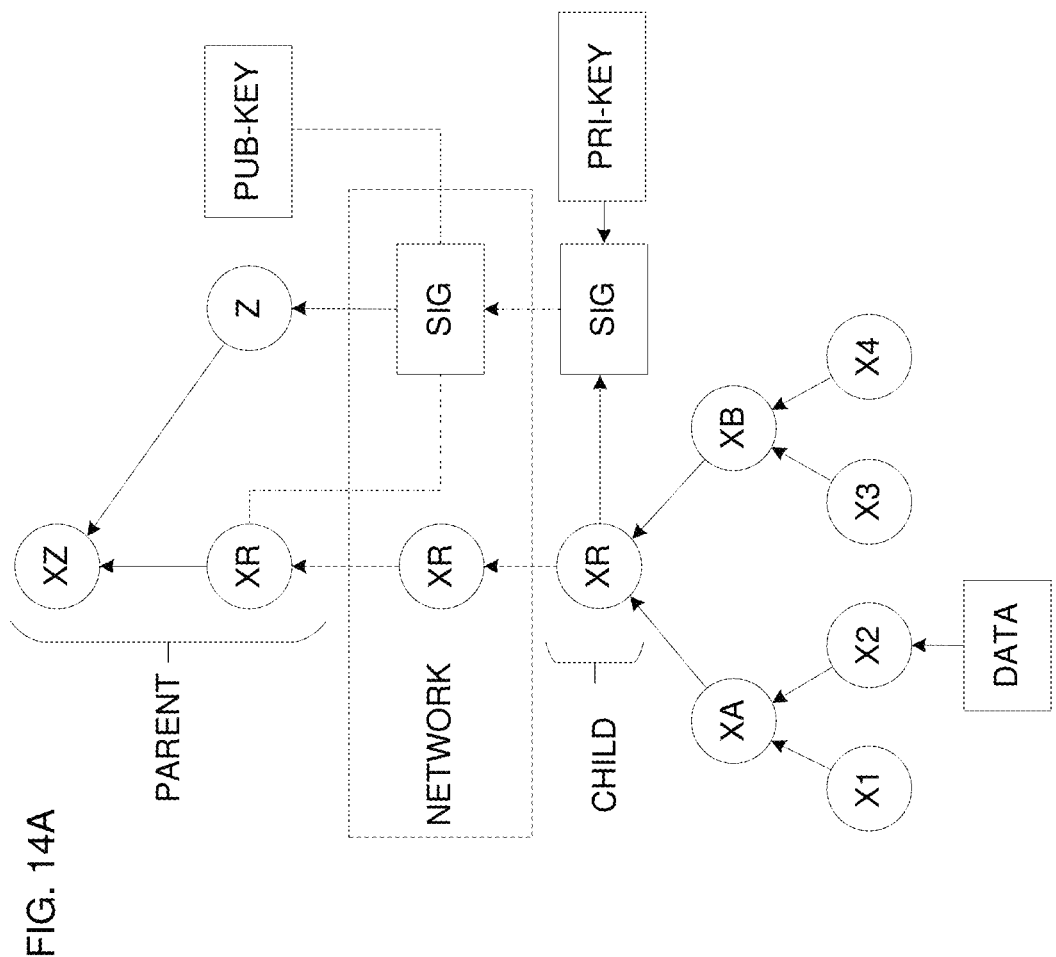
Figure 15B:
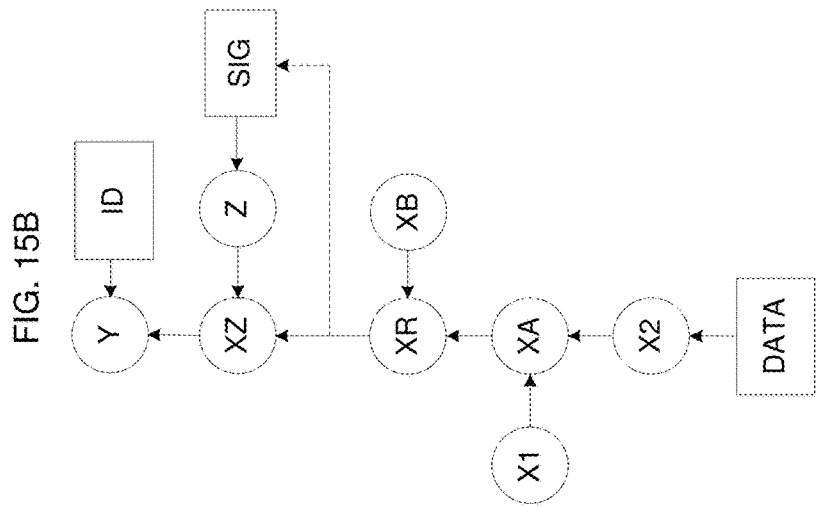
Figure 15A:
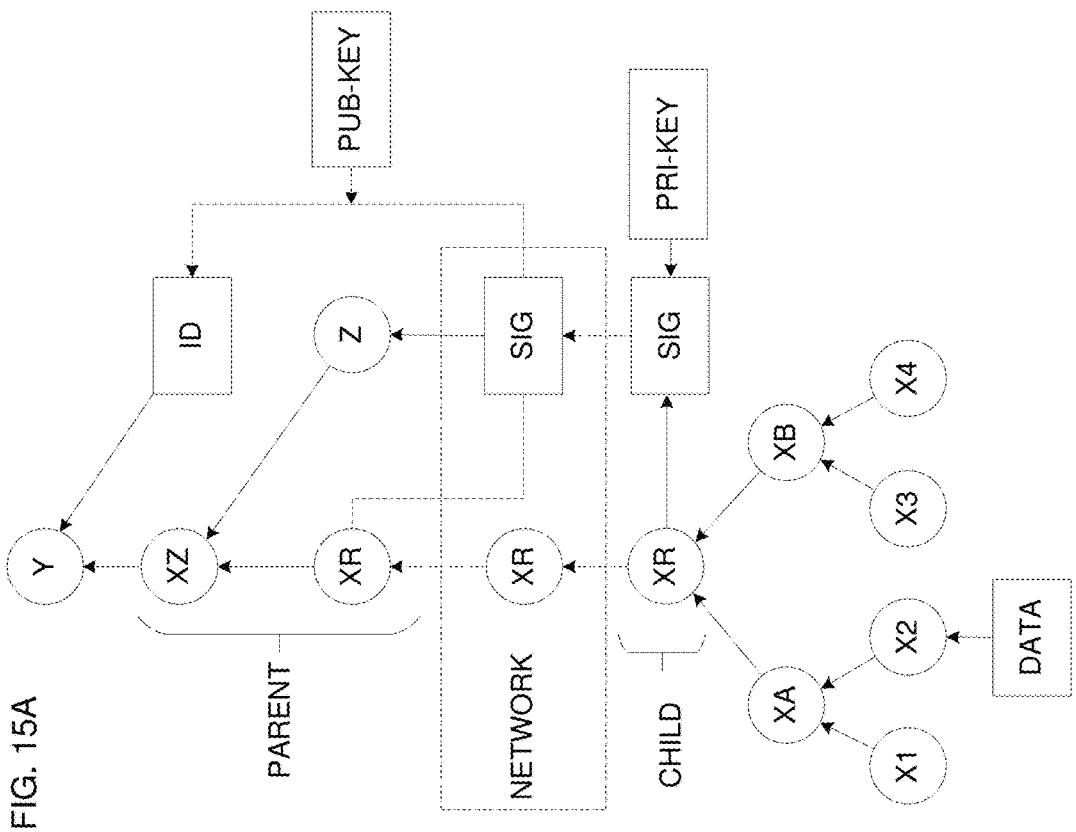

As the signature is computed from CHILD's aggregation root XR, a malfunctioning or even a malicious parent would not be able to attach it to another request. Any such attempt would be discovered when verifying the link from XR to Z in the resulting hash chain (FIG. 14B).

Signing for Authentication, with Server-Attested ID

If desired, it would still be possible to include the PARENT entity's attestation about CHILD's identity when using CHILD's entity signature instead of its HMAC. In such an embodiment, the CHILD would send its request along with its entity signature (FIG. 15A) SIG, derived from its private key (PRI-KEY) and its root value XR. The PARENT, after verifying the entity signature (using the corresponding public key PUB-KEY and linking it to hash from CHILD's request, could additionally attach its attestation ID about client identity to the hash chain and use Y as the identity leaf of its own aggregation sub-tree. The resulting hash chain (FIG. 15B) would include both the CHILD's entity signature SIG and PARENT's attestation of CHILD's identity in a manner similar to when the signing was done on CHILD side and the request authenticated by HMAC.

Note that the similarity of the hash chains (computation paths) resulting from these different "strengthening" embodiments corresponds to the similarity of the proof levels achieved: in both cases the entity signature, having been produced with the CHILD's private key (PRI-KEY), provides non-repudiation, and the identity, having been inserted by PARENT based on presumed verification of the incoming request, provides an attestation by PARENT, but no non-repudiation.

Although the description above of different identity-strengthening embodiments refers to "the" or "a" child entity and "the" or "a" parent entity, the data structures and methods used for one such pair may of course be replicated for any number of child-parent pairs, including for different child entities of a single parent, and even in the same calendar period.

The embodiments illustrated in FIGS. 11A-15B include either or both of the features of removable server attestations and non-removable client signatures, and direct and indirect linking of signatures and identity values. Note that these features may be included in any given implementation in any permutation.

We claim:

1. A method for authenticating digital records, comprising:
   receiving, in a parent entity, from at least one subordinate child entity a respective, current child output value that is formed as digital combinations of successively lower-level combined output values computed in subordinate entities as node values of a tree data structure having lowest level inputs formed as digital transformations of digital input records input by user-level entities, said parent and child entities comprising computational nodes in the tree data structure;
   forming a parent output value as a function of a digital combination of the child output value and a function of a child-associated signature;
   submitting from the parent entity the parent output value as a request to a superior entity in the tree data structure;
   computing a current calendar value as a digital combination of current highest-level aggregated output values of the tree data structure, and transmitting a signature vector to at least one of the user-level entities, said signature vector being associated with the corresponding digital input record and including recomputation parameters corresponding to sibling values in a recomputation path upward through the tree data structure, including the parent output value, such that an arbitrary subsequent test digital record is considered authenticated relative to the corresponding digital input record if, applying the corresponding digital transformation to the test digital record and, using the recomputation parameters, the same current calendar value is attained;
   storing a function of at least one current calendar value in an unalterable medium.

2. The method of claim 1, in which the child-associated signature is a hash message authentication code of the child entity.

3. The method of claim 1, in which the function of the child-associated signature is a hash of a signature value derived as a function of the child output value and a private key associated with the child entity.

4. The method of claim 1, further comprising:
   computing, in the parent entity, a child attestation identity value as a function of a client-specific identity key and a message authentication code of the child entity; and
   computing the parent output value as a function also of the child attestation identity value.

5. A method for authenticating digital records, comprising:
   receiving, in a parent entity, from at least one subordinate child entity a respective, current child output value that is formed as digital combinations of successively lower-level combined output values computed in subordinate entities as node values of a tree data structure having lowest level inputs formed as digital transformations of digital input records input by user-level entities, said parent and child entities comprising computational nodes in the tree data structure;
   computing a parent output value as a function to include a child entity attestation identity value computed as a function of a client-specific identity key and a message authentication code of the child entity; and
   submitting from the parent entity the parent output value as a request to a superior entity in the tree data structure;
   computing a current calendar value as a digital combination of current highest-level aggregated output values of the tree data structure, and transmitting a signature vector to at least one of the user-level entities, said signature vector being associated with the corresponding digital input record and including recomputation parameters corresponding to sibling values in a recomputation path upward through the tree data structure, including the parent output value, such that an arbitrary subsequent test digital record is considered authenticated relative to the corresponding digital input record if, applying the corresponding digital transformation to the test digital record and, using the recomputation parameters, the same current calendar value is attained;
   storing a function of at least one current calendar value in an unalterable medium.

* * * * *